S. PFLASTER.
EXHIBITING DEVICE.
APPLICATION FILED JUNE 7, 1919.

1,328,192.

Patented Jan. 13, 1920.
4 SHEETS—SHEET 1.

WITNESSES
Frederick Diehl.
A. L. Kitchin.

INVENTOR
Simon Pflaster
BY
ATTORNEYS

S. PFLASTER.
EXHIBITING DEVICE.
APPLICATION FILED JUNE 7, 1919.

1,328,192.

Patented Jan. 13, 1920.
4 SHEETS—SHEET 3.

WITNESSES
Frederick Diehl.
A. L. Kitchin

INVENTOR
Simon Pflaster
BY
ATTORNEYS

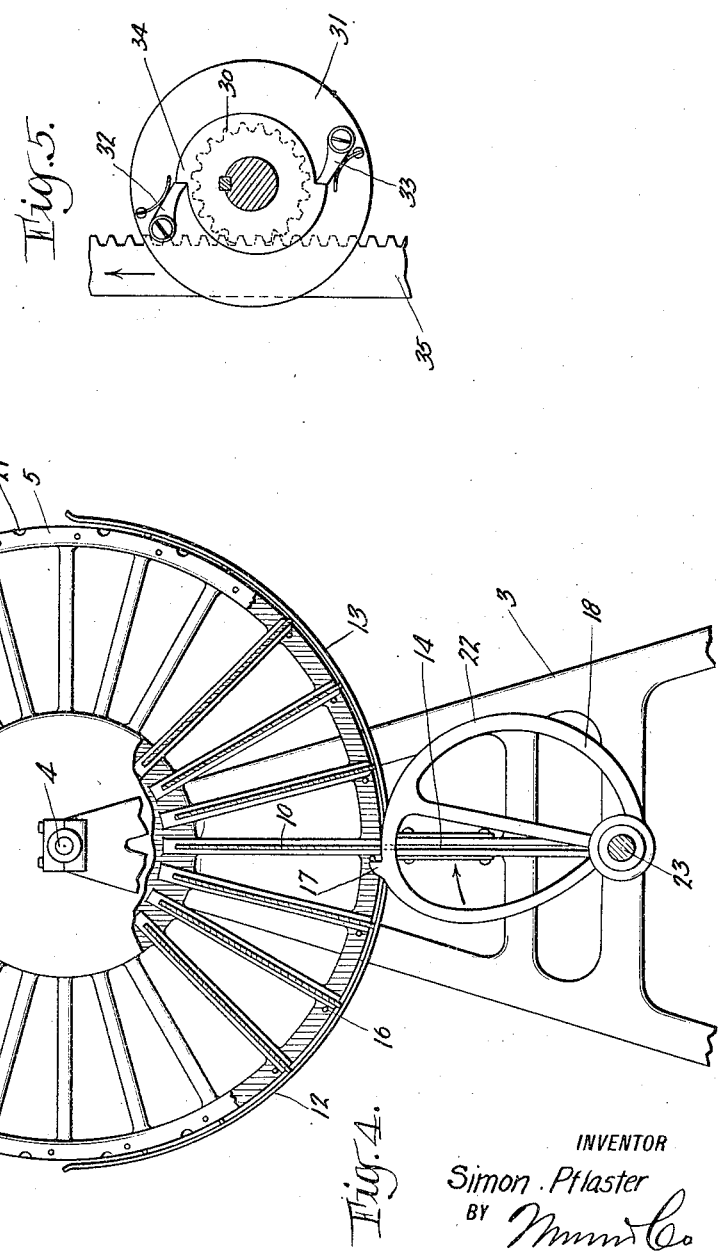

UNITED STATES PATENT OFFICE.

SIMON PFLASTER, OF NEW YORK, N. Y.

EXHIBITING DEVICE.

1,328,192.  Specification of Letters Patent.  Patented Jan. 13, 1920.

Application filed June 7, 1919. Serial No. 302,396.

*To all whom it may concern:*

Be it known that I, SIMON PFLASTER, a citizen of the United States, and a resident of the city of New York, borough of Manhattan, in the county and State of New York, have invented a new and Improved Exhibiting Device, of which the following is a full, clear, and exact description.

This invention relates to exhibiting devices and has for an object the provision of an improved construction which is simple in the general makeup and easy of operation whereby pictures or other things are exhibited successively.

Another object in view is to provide a machine which will automatically operate for bringing slides and negatives to a position for being projected on a screen at timed intervals.

A still further object of the invention is to provide an exhibiting device with a rotating wheel carrying slides and a cam means for rotating the wheel and moving the slides successively.

In the accompanying drawings:

Fgure 1 is a side view of an exhibiting device disclosing the invention.

Fig. 4 is a view similar to the upper part of Fig. 1, but with certain parts broken away for illustrating how the cam propels the slide carrying wheel.

Fig. 5 is an enlarged detail fragmentary sectional view showing the arrangement of pawls and ratchet, whereby the cam shown in Fig. 4 is moved at the proper time.

In exhibiting devices of the character shown in the accompanying drawings, means are provided for causing a successive projecting of views on a screen. According to the present invention it is intended to use ordinary commercial slides and to cause the machine to automatically shift the slides at stated intervals without any assistance from an operator after the machine has once been started. After all the slides have been shown once the machine automatically begins to repeat and so on for as long as the power is turned on.

Figure 1:
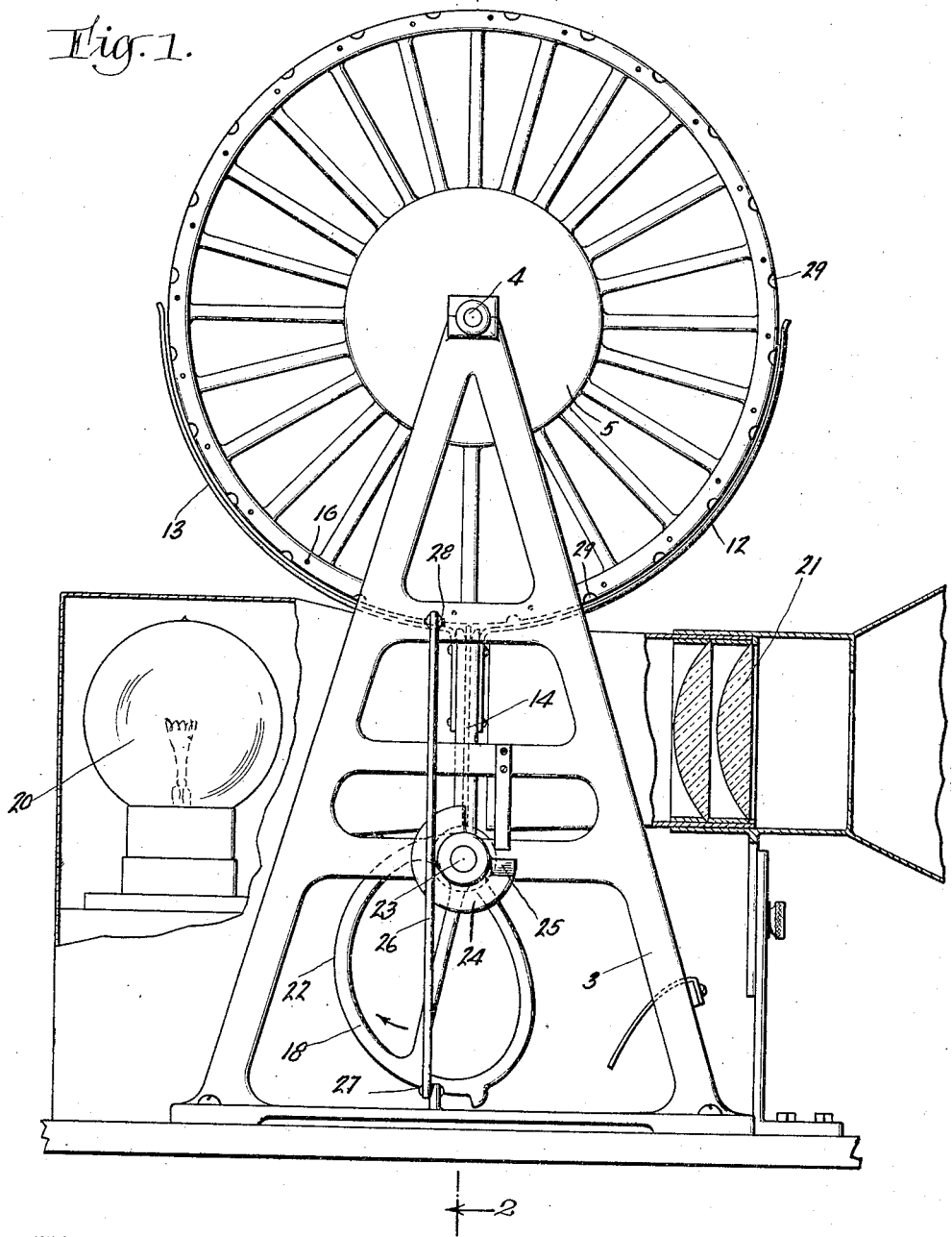
Figure 2:
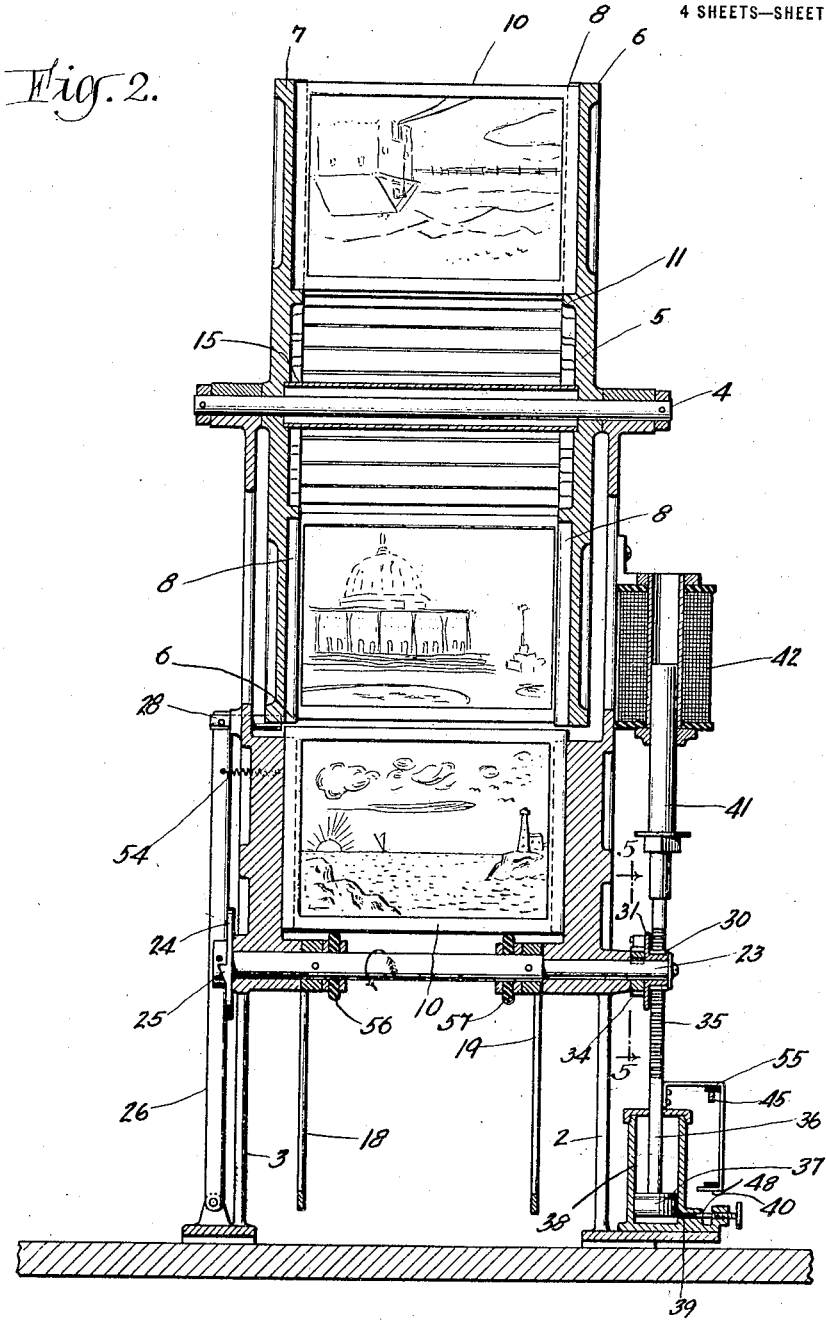
Fig. 2 is a sectional view through Fig. 1 on line 2—2.

Referring to the accompanying drawings by numerals, 1 indicates a base of any desired kind and 2 and 3 standards or supporting frames which support at their upper ends a shaft 4, and which support at different points other parts hereinafter fully described. Shaft 4 extends entirely through the device as shown in Fig. 2, and carries a drum or slide wheel 5, which drum or slide wheel is formed with side members 6 and 7, each of which is provided with a plurality of radial slides or guides 8, there being the same number of slides 8 in each member 6 and 7, so that the various slides 10 will properly fit in the wheel or drum 5. An annular shoulder 11 is provided near the hub against which the slides rest when in one position, while in the opposite position the slides may bear against the supporting guards 12 and 13 until they come opposite the guiding slides 14, whereupon they drop by gravity downwardly into said guiding slides rigidly secured to or formed integral with the standards 2 and 3. Preferably the members 6 and 7 are independent and rigidly secured to shaft 4, but are spaced apart by the hub or tubular member 15 to which they may be secured rigidly if desired. A plurality of pins 16 extend through the side members 6 and 7 and act as stops for engaging the lugs 17 on the cams 18 and 19. If desired these lugs could be cast or formed integral with the side members 6 and 7 without departing from the spirit of the invention. It will be noted that there will be one stop 16 for each slide, and said stops are arranged adjacent the slots or grooves 8. The slides 10 are preferably the ordinary commercial slide now in common use and of a standard size formed of glass with a suitable frame of paper or other material. These commercial slides may be purchased in any desired quantities and with any desired subject matter thereon. If it is desired to exhibit pictures of any particular place or to advertise some goods at a certain place the proper pictures may be provided to agree with the advertising matter, and all of these arranged in a proper order in the various slots 8 in the wheel or drum 5. After the slides have been arranged in place the machine is started as hereinafter described and the lugs 17 on the cams 18 and 19 moved together with the cams until the next slide is opposite the slides 14 as shown in Fig. 4, whereupon the next slide will drop by gravity into said slot, as the cams drop quicker by gravity to a lower position as shown in Fig. 1.

A lamp 20 is provided which is opposite the center of the space between the slots 14 so that when a slide drops into the slot the light will project through the slide and through the lens 21 and from thence be projected on to the screen. In order to raise the slide after it has been exhibited a proper length of time and to again turn the wheel or drum 5 cams 18 and 19 are rotated for slightly over half a revolution and dropped into the position shown in Fig. 1. When they are thus rotated cams 18 and 19 engage the bottom edge of the slide in the slots 14 and gradually raise the same until the slide is again positioned in its particular slots 8 in the drum. The continued motion of the cams will naturally bring the lugs 17 against the stop 16 for rotating the wheel. In order that the cams may properly rotate the same are rigidly secured to the shaft 23 in any desired manner, as for instance by pins, and said shaft is journaled in suitable bearings in standards 2 and 3 as shown in Fig. 2.

Figure 3:
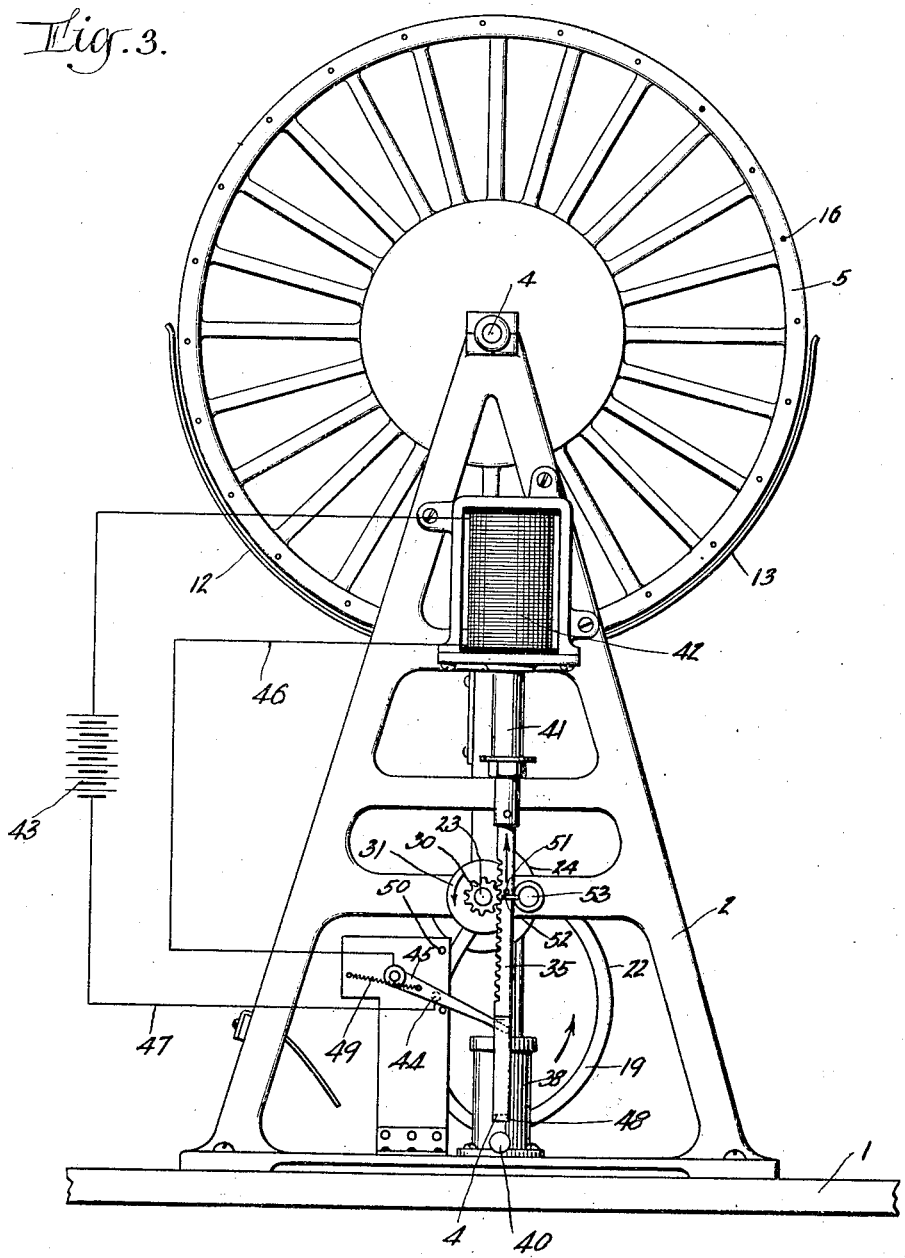
Fig. 3 is a view of the exhibiting device shown in Fig. 1, but from the opposite side.

One end of shaft 23 has a disk 24 rigidly secured thereto, said disk having a cam 25 positioned thereon designed to engage the rod or link 26 which is pivoted at 27 on the lower part of standard 3 which carries a locking pin 28 at the upper end extending through part of standard 3, which acts as a bearing therefor, and into one of the notches 29 in the drum or wheel 5. The locking pin 28 is intended to positively lock the drum or wheel 5 against movement until the cam 25 acting on the rod 26 withdraws the locking pin, which withdrawal takes place a very brief time before the lug 17 strikes the stop 16. On the end of the shaft 23 opposite the disk 24 is loosely mounted a pinion 30, which is formed integral with, or rigidly secured to a disk 31, said disk carrying preferably a pair of pawls 32 and 33, (Figs. 2 and 5), which pawls engage the ratchet wheel 34 rigidly secured to the shaft 23. Pinion 30 is continually enmeshed with a reciprocating rack 35 which rack merges into a piston rod 36 at the lower end connected to piston 37 positioned in the jacket or dashpot structure 38. Dashpot structure 38 is provided with a relief aperture 39 in which the end of the valve 40 is positioned, said valve being adjustable whereby the aperture 39 may be opened or closed to any desired extent for relieving the air pressure in member 38 to any desired extent in order that the piston 37 and the rack 35 may move downwardly either fast or slow. These members preferably move down under the action of gravity, though a spring could be provided for assisting the downward movement. However, ordinarily the weight of these parts, together with the weight of the core 41 is sufficient to produce the desired speed in the downward movement. The core 41 fits into a solenoid 42. The solenoid 42 is supplied with current from any suitable source 43 as for instance batteries or from an ordinary supply line, said line also being connected to the contact 44 whereby when the switch arm 45 is in the position shown in Fig. 3 current will pass from the source to the solenoid and from thence through wire 46 to switch arm 45 and from the switch arm through contact 44 to the wire 47 back to the source 43, thus energizing the core. When the core is thus energized it will quickly raise the rack 35 and associate parts until the projecting end 48 strikes against the end of the switch arm 45 and raises the same off the contact 44, and in fact moves the same until the spring 49 passes dead center, whereupon the arm will be swung to a position against the stop 50. This quick movement of the switch arm 45 switches off the current from the solenoid 42 and consequently allows the core 41, rack 35 and associate parts to move downwardly under the action of gravity, or under the action of gravity and a spring, in case a spring is used. As the solenoid 42 moves the core 41 upwardly the pinion 30 is rotated, and as the same is connected to shaft 23 through the pawls 32 and the ratchet wheel 34 the shaft 23 will be rotated together with the cams 18 and 19 quickly for a half revolution or slightly more than a half revolution, namely until the cam 22 has raised the slide as shown in Fig. 4 and the lug 17 moved the wheel or drum 5, until said lug 17 has become free from the stops 16 so as to fall by gravity to a position shown in Fig. 1.

Arranged on rack 35 is a stop 51 for limiting the downward movement of the rack, said stop engaging a suitable pin 52 rigidly secured to a projection 53, which projection is connected with or formed integral with the standard 2. In addition to the rack rotating the pinion 30 and the shaft 23 it rotates the disk 24 and cam 25 connected to shaft 23 so as to withdraw the locking pin 28 immediately before the lugs 17 engage the stops 16. The locking pin 28 is held withdrawn a very short time and is again allowed to press against the drum or wheel 5 under the action of spring 54 so as to slide along the wheel until it can snap into one of the notches 29, as soon as the drum or wheel 5 has been rotated the proper distance by the action of the lugs 17.

In operation, when the parts are arranged as shown in Fig. 1 for instance, with one slide in the guides 14 the current is turned on, which will immediately energize lamp 20 and energize the solenoid 42 whereupon the slide will be moved back into the wheel or drum 5 and said wheel or drum moved until the next slide drops into the guides 14. This upward movement of the core 41 and associate parts switches off the current from the solenoid 42. The picture will remain in the guides 14 until the switch arm 45 has been moved by insulated shoulder 55 downward to the position shown in Fig. 3 whereupon the circuit will be closed and the device operated, namely, the core 41 and associate parts will be moved upwardly and cams 18 and 19 and associate parts will be moved for shifting the slides and drum 5. The new slide will be projected until shoulder 55 has again caused the switch arm 45 to close the circuit. This action is continued as long as current is supplied to the solenoid 42 and the circuit connected therewith. The time in which it takes the shoulder 55 to move the switch arm to a closed position depends upon the position of the valve 40 controlling the outlet of the dashpot 38. If desired the upper part of the dashpot 38 may have an opening therein and the piston 37 provided with a washer, on the nature of a pump washer, whereby the return of the piston and associate parts may be comparatively quick while the downward movement may be very slow.

As above stated when the slides come opposite the guides 14 they drop downwardly into said guides. In order to cushion the fall of these slides resilient bumpers 56 and 57 are provided as shown in Fig. 2, said bumpers being preferably a disk of rubber held in position on the shaft 23 by any desired means.

What I claim is:

1. An exhibiting device of the character described, comprising a rotatable carrier provided with means for holding a plurality of slides which may move therefrom under the action of gravity when in the proper position, a pair of guides for said slides arranged beneath said carrier for receiving the slides successively under the action of gravity, a pair of cams formed with projections, said cams when moved acting to raise a slide in said guides and force the same back into said carrier while the projections act to move the carrier a sufficient distance whereby the next slide may fall by gravity into said guides, means for moving said cams intermittently, and a projecting device for projecting the slide in said guides.

2. An exhibiting device of the character described comprising a rotatable carrier having grooves therein for carrying slides, a guide arranged below and in vertical alinement with the center of the carrier for receiving said slides successively under the action of gravity when moved to a position opposite said guide, a pair of cams for raising said slides and forcing the same back into the carrier, a projection arranged on the end of each of said cams, a pair of stops for each of said slides in said carrier, said stops being adapted to be engaged by said projection so that as the cam finishes its movement it will move the carrier until the next slide comes opposite said guide, whereupon said next slide will drop downwardly by gravity into said guide, means for operating said cams intermittently, and means for projecting a beam of light through said slides when in said guide.

3. An exhibiting device of the character described comprising a drum or wheel having radial grooves therein, said drum or wheel acting as a carrier for slides, a pair of guides arranged below said wheel positioned so as to receive the slides therefrom under the action of gravity, a pair of retaining guards partially surrounding said wheel on each side of said guides so that as said wheel rotates the slides will remain therein until they come opposite said guides, a plurality of pins positioned on said wheel, there being one pin for each radial groove, a rotatable cam for returning said slides from said guides to the grooves in said wheel, said cam having a projection adapted to engage successively said pins for intermittently rotating said wheel, and means for projecting a beam of light through said slides when in said guides.

4. An exhibiting device comprising a rotatable carrier adapted to slidingly support slides, a pair of guides for receiving said slides successively under the action of gravity, means for returning said slides and rotating said carrier a predetermined distance for causing a slide to move into said guides, a shaft moving said slide returning means, a pinion loosely mounted on said shaft, means for connecting said pinion with the shaft so that when the pinion is rotated in one direction the shaft will be rotated, and when the pinion is rotated in the opposite direction the shaft will not be moved, a rack meshing with said pinion, a magnetic power member for moving said rack in one direction, said rack moving in the opposite direction under the action of gravity, means for supplying current to said magnetic power member, and means operated by said rack for turning said current on and off.

5. An exhibiting device comprising a carrier for slides, a lamp for providing a beam of light, means in front of said lamp for receiving said slides successively under the action of gravity from said carrier, means for moving said carrier for causing the slides in said carrier to come opposite the slide receiving means, said carrier moving means being formed with cams for moving the slides from said receiving means back into said carrier, and operating means for said carrier moving means, said operating means comprising a pinion, a pawl and ratchet mechanism for connecting said carrier moving means with said pinion, a rack continually meshing with said pinion, electro-magnet means for moving said rack in one direction, a damping member for retarding the movement of said rack in the opposite direction, means for regulating the movement of said damping member, means for connecting current to said electro-magnet means, a switch for switching on and off said current, said switch having an arm operated by the movement of said rack so that the current is turned on when the rack is in its lowest position and turned off when the rack is in its highest position.

6. An exhibiting device of the character described comprising a support for slides, means for projecting a beam of light through the slides when in the support, a carrier for supplying slides to said support, means for moving said slides out of said support and operating said carrier so that slides therefrom may successively enter said support, a pinion, a pawl and ratchet connected with said pinion and with said means whereby the pinion will operate said means when moved in one direction and will operate freely when moved in the opposite direction, a rack meshing with said pinion continually, an electrically operated means for moving said rack so as to operate said pinion, means for supplying said electrically operated means with current, a switch arranged in said electrically operated means, a bracket extending from said rack having a pair of stops adjacent to engage said switch so that when the rack is in its lowermost position one of said stops will close the switch, and when in its highest position the other stop will open the switch.

7. An exhibiting device of the character described comprising a support for slides, means for projecting a beam of light through the slides when in the support, a carrier for supplying slides to said support, rotatable cams for moving said slides out of said support and operating said carrier so that the slides therefrom may successively enter said support, a pinion, a ratchet connected with said cams, a pawl connected with said pinion and co-acting with the ratchet for moving the ratchet when the pinion is moved in one direction, a rack continually meshing with said pinion, and an electrically operated means for moving the rack in one direction, said rack being moved in the opposite direction under the action of gravity.

SIMON PFLASTER.